United States Patent
Commarford et al.

(10) Patent No.: US 9,135,229 B2
(45) Date of Patent: Sep. 15, 2015

(54) AUTOMATED CLIPBOARD SOFTWARE

(75) Inventors: Patrick Michael Commarford, Louisville, KY (US); James Lee Lentz, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1311 days.

(21) Appl. No.: 12/625,717

(22) Filed: Nov. 25, 2009

(65) Prior Publication Data
US 2011/0125970 A1    May 26, 2011

(51) Int. Cl.
*G06F 12/00* (2006.01)
*G06F 17/24* (2006.01)
*G06F 9/54* (2006.01)
*G06F 13/00* (2006.01)
*G06F 13/28* (2006.01)

(52) U.S. Cl.
CPC ............. *G06F 17/24* (2013.01); *G06F 9/543* (2013.01)

(58) Field of Classification Search
CPC ................................. G06F 9/543; G06F 17/24
USPC ................. 715/700, 769, 770; 711/154
See application file for complete search history.

(56) References Cited

U.S. PATENT DOCUMENTS

| | | | |
|---|---|---|---|
| 6,309,305 B1* | 10/2001 | Kraft | 455/566 |
| 7,346,852 B2 | 3/2008 | Yamasaki | |
| 7,516,398 B2* | 4/2009 | Yang | 715/230 |
| 2004/0172584 A1 | 9/2004 | Jones et al. | |
| 2005/0091603 A1 | 4/2005 | Chen et al. | |
| 2007/0061747 A1 | 3/2007 | Hahn et al. | |
| 2008/0201656 A1* | 8/2008 | Kim et al. | 715/770 |
| 2009/0100503 A1* | 4/2009 | Doyle | 726/3 |
| 2009/0157741 A1 | 6/2009 | Cheng et al. | |
| 2009/0172581 A1 | 7/2009 | Burling et al. | |
| 2011/0126092 A1* | 5/2011 | Harris | 715/256 |

OTHER PUBLICATIONS

Jeffrey Stylos, "Citrine: Providing Intelligent Copy-and-Paste", Proceedings of the 17th annual ACM symposium on User Interface Software and Technology, 2004, pp. 185 to 188.

* cited by examiner

*Primary Examiner* — Mark Giardino, Jr.
(74) *Attorney, Agent, or Firm* — Marcia L. Doubet (57) ABSTRACT

A clipboard software application running on a computer system that automatically selects at least one data item to be pasted to a target destination area upon determining at least one data item in the clipboard memory buffer is appropriate for pasting to the target destination area. A clipboard memory buffer stores a plurality of data items, each data item associated with one or more data traits. The clipboard application selects at least one data item from the clipboard memory buffer upon determining a user selected data item is not appropriate for the target destination area.

18 Claims, 4 Drawing Sheets

AUTOMATED CLIPBOARD SOFTWARE

FIELD

Embodiments of the invention relate to the field of computing technologies, and more specifically, to an automated computer clipboard software application.

BACKGROUND

Standard computer clipboard software solutions allow users to place text or images on the computer clipboard through manual cut or copy actions and then paste the most recently collected item to a destination target area. Using these solutions, users commonly attempt to paste improper data to the target area. Consider this example:

Step 1—a user enters an email address into a form.

Step 2—the user copies the email address.

Step 3—the user pastes an email address into a "confirm email address" field of the form, completes the form and submits.

Step 4—the user selects and copies an image, then pastes the image into a suitable target area (e.g., a slideshow presentation) and then the user starts to compose a new form.

Step 5—the user attempts to paste his email address into the "Email address" field of a second form, but nothing happens because the most recent addition to the clipboard is an image. The text input field labeled "Email address" doesn't accept images (nor should it). Now the user has to either manually enter the email address or return to the source to re-copy the email address and paste it into the second form.

Another example would occur if the user copied a page of text in step 4 and then accidentally pasted the text (rather than the email address that the text had replaced on the clipboard) into the "To" field of the message header of an email message the user was composing. In this case, depending on the email application, the "To" field will often accept the text, which is, of course, not what the user intended.

Some versions of clipboard software allow users some mechanism for manually choosing an item from the clipboard other than the most recently added data item. For example, if a user wants to paste any item other than the most recently added item from a clipboard, he will have to first manually select an item from a visual representation of the items on the clipboard. However, this manually selected item may or may not also be appropriate for the target destination area.

SUMMARY

A clipboard software application running on a computer system that automatically selects at least one data item to be pasted to a target destination area upon determining at least one data item in a clipboard memory buffer is appropriate for pasting to a target destination area is described. The clipboard memory buffer stores a plurality of data items, each data item associated with a data trait. The clipboard application to select at least one data item from the clipboard memory buffer upon determining a user selected data item is not appropriate for the target destination area.

BRIEF DESCRIPTION OF THE SEVERAL VIEWS OF THE DRAWINGS

The invention may be understood by referring to the following description and accompanying drawings that are used to illustrate embodiments of the invention.

DETAILED DESCRIPTION

In the following description, numerous specific details are set forth. However, it is understood that embodiments of the invention may be practiced without these specific details. In other instances, well-known structures and techniques have not been shown in detail in order not to obscure the understanding of this description.

A computer clipboard software application having logic to automatically select a compatible or appropriate data item to store in a target destination area (e.g., a data field, software application input area, etc.) on a graphical user interface is described. The clipboard application may be stored in the temporary or a persistent memory buffer that is accessible by multiple software applications running on a computer system. The clipboard application allows for multiple data items to be stored on the clipboard memory buffer simultaneously. Each of the data items could have a data trait that describes one or more characteristics of each data item. For example, the clipboard memory buffer might store a data item associated with a data trait that represents text data, numeric data, image data, date/time formatted data, Boolean data, as well as the size of the data item or other data formats, data types (including semantic features and patterns), and characteristics of structured and unstructured data well known to those of skill in the art.

Figure 1:
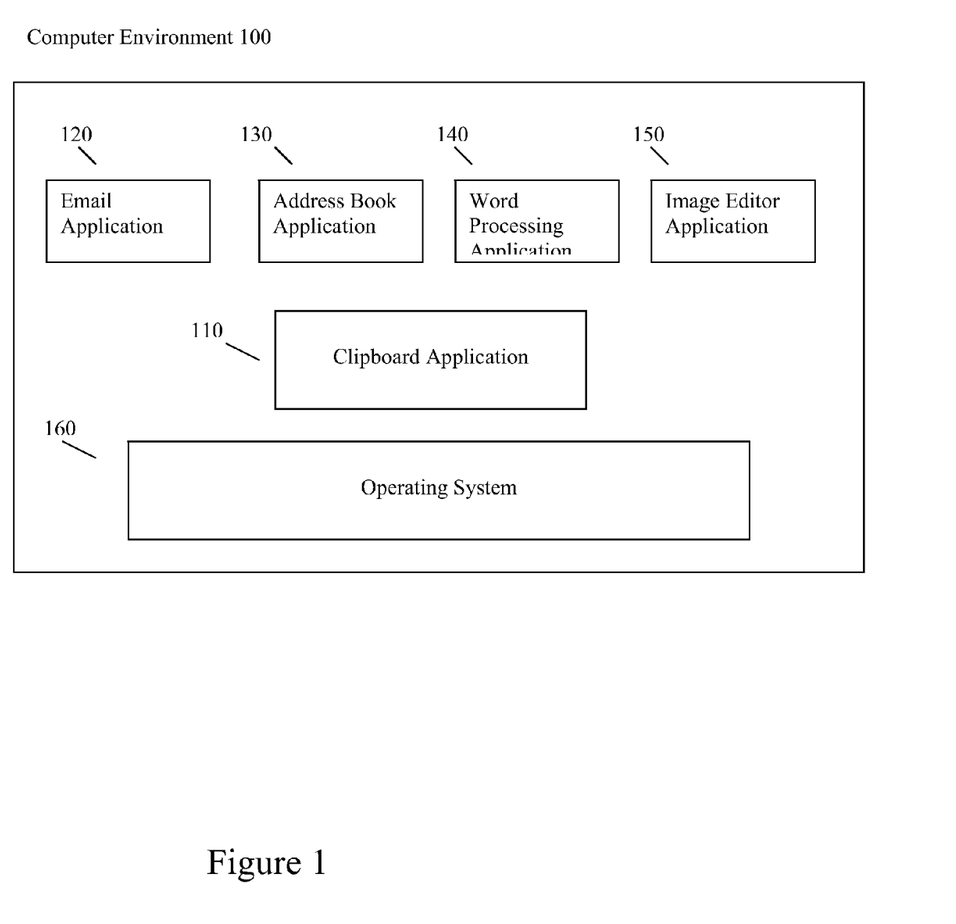
FIG. 1 illustrates a block diagram of a computing environment operating on a computer system according to one embodiment of the invention.

FIG. 1 illustrates a block diagram of a computing environment 100 operating on a computer system 400 according to one embodiment of the invention. In this example, the computing environment 100 includes a clipboard application 110, multiple computer software applications such an email software application 120, address book application 130, word processing application 140, and image editor application 150. Computing environment 100 also includes an operating system 160. It is understood that the invention is not limited to these software applications or any operating system. One of ordinary skill in the art will recognize that this invention may be used on a computer system with various software applications or on a computer system without an operating system. Also, in one embodiment, the clipboard application 110 may be incorporated as part of the operating system 160 or incorporated as part of any of software applications 120-150 or incorporated as a part of a suite of software applications, etc. Also, the computing environment 100 may or may not include persistent data store (e.g., a hard drive) that could store the software applications permanently on the computing environment 100. The clipboard application 110 and software applications 120-150 might also be stored on disparate computer systems accessible over a network connection (e.g., the Internet or World Wide Web, local area network, wide area network, etc) by a user using, for example, an Internet browser.

The email software application 120 may include software that enables a user to compose, read, edit, or send electronic mail messages (email). Examples of email software applications include Yahoo! Mail from Yahoo! Inc. of Sunnyvale Calif., and Google gmail from Google Inc. of Mountain View, Calif.

The address book application 130 may include software that enables users to store and manipulate contact data about specific individuals or entities. The contact data is typically organized by data fields such as contact first name, contact last name, contact email address, contact work phone number, contact home phone number, contact mobile phone number, etc. As will be shown, data field names may be used as a data trait associated with a data item or a target destination area to allow the clipboard application 110 to select of the an appropriate data item from the clipboard memory buffer to paste into a destination target area. Examples of address book applications include the Yahoo! Address book and Google gmail address book.

The word processing application 140 includes software that enables a user to compose, edit, format, and print documents which are well known in the art. The image editor application 150 allows a user to manipulate a digital image such as, for example, a digital picture.

Figure 2:
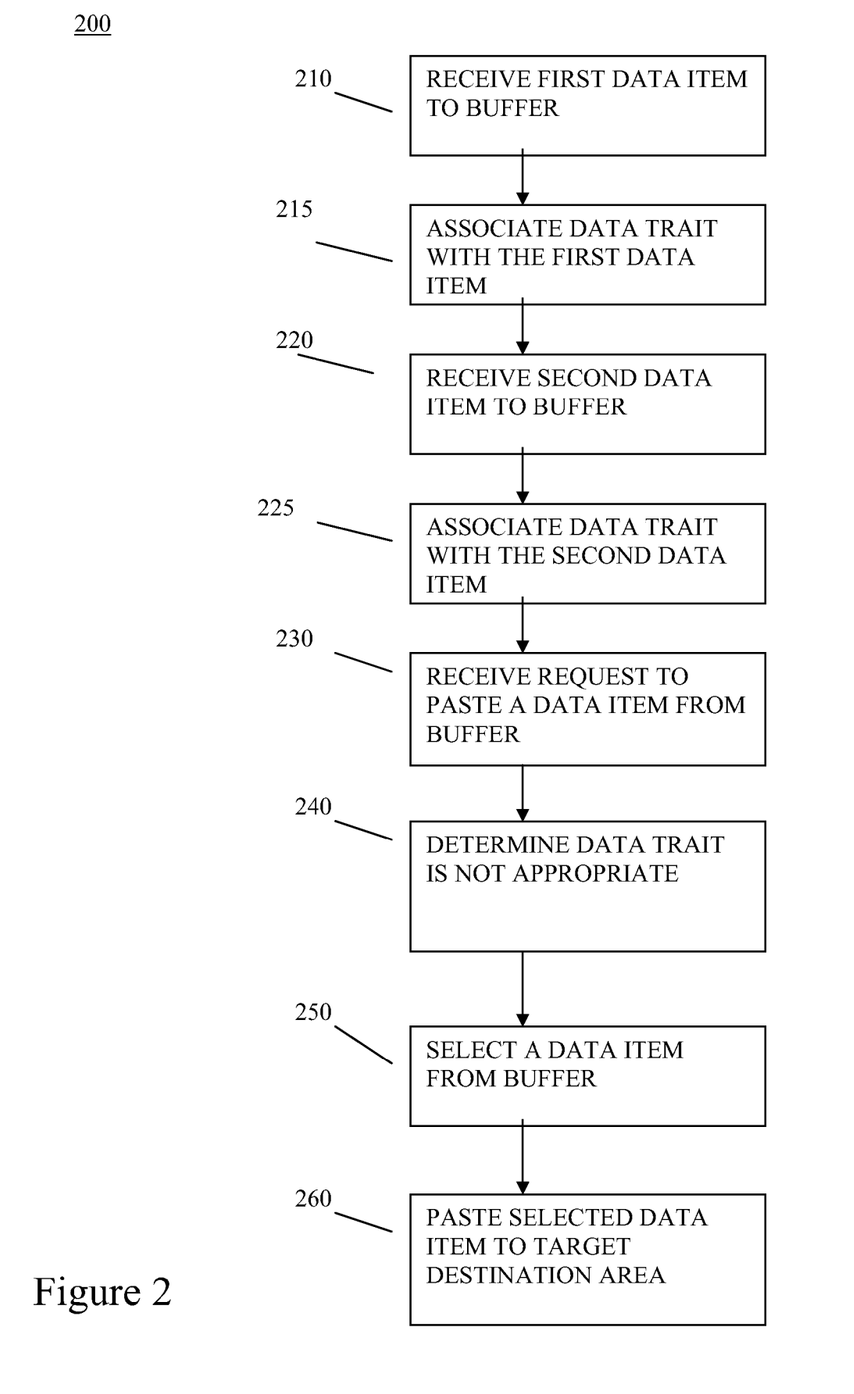
FIG. 2 illustrates one embodiment of a process flow to select an appropriate data item to paste in a target destination area.

FIG. 2 illustrates one embodiment of a process flow 200 to select an appropriate data to store in a target destination area. At block 210, the clipboard application 110 receives a first data item. For example, a user may copy an email address from an address book software application 130 using well know copying techniques such as highlighting the email address and selecting an option to copy, cut or otherwise add to the clipboard the highlighted email address using the mouse clicks, function keys, a stylus, hotkey functions, as well as other copying techniques well known to those in the art.

At block 215, the clipboard application 110 associates a data trait(s) with the received data item. In this way, the data trait might later be used to help determine if the data item is appropriate or compatible with a specific target destination area. Data trait information might indicate the attributes, characteristics, or data type of the data item. Such data trait information might be obtained from metadata associated with the copied data item. Metadata is data that describes other data. For example, metadata might identify a data item to be associated with an email address, a phone number, image data, etc.

Alternatively, if the data item does not have metadata associated with it the clipboard application 110 might use algorithms or rules to attempt to provide a best guess of a data trait of the data item. For example, the clipboard application 110 might infer a data trait from the format of a copied data item such as inferring a data item is an email address when the data item has an email address format (xxx@yyy.zzz), or a phone number when the data item has a phone number format (555-555-5555), a data/time when the data item has a date/time format (e.g., MM/DD/YY, MM/DD/YYYY, YYYY/MM/DD, etc), a uniform resource locator (URL) when the data item has an URL format (www.xyz.zzz), etc.

Also, the clipboard application 110 might associate a data trait with a data item based on the application type from which the data is received. For example, if the data item if copied from an image editor application 150, then it might determine or infer a data trait which will indicate that that data is more likely to be appropriate to be pasted into applications that might accept image data (e.g., image edit applications, word processing applications, etc). While the clipboard application 110 might infer a large string of text might be more appropriate for word processing application or an email application, etc.

In one embodiment, the clipboard application 110 might also collect a history of how a user might repeating select specific data items from a specific source to be pasted into specific applications. In this way, the clipboard application 110 learns a user pasting tendencies to provide a best guess of how specific data items might be appropriate to paste into a specific target destination area.

At block 220, the clipboard application 110 receives a second data item to be added to the clipboard memory buffer. For example, a user may copy an image from a photo editing software application to the clipboard memory buffer. At this point, the first data item (e.g., the email address) and the second data item (e.g., picture) have different data traits.

At block 225, the clipboard application 110 associates a data trait with the second data item, for example, as described above with block 215. At block 230, the clipboard application 110 receives a request to paste a data item from the clipboard memory buffer to a target destination area. Typically, the request is to copy the most recent data item in the target destination area. Continuing the example, the user presently attempts to paste the image into the target destination area.

At block 240, the clipboard application 110 determines the data trait of the second data item is not appropriate for the target destination area. Continuing the example, the clipboard application 110 determines the image data is not the most appropriate type of data to be stored in an email address field. The clipboard application 110 may make this determination using current techniques of concluding that any specific data item is not appropriate to be pasted into the target destination area. Alternatively, the clipboard application 110 might compare the data trait of the data to be pasted with the data trait of the target destination area. For example, in one embodiment, the clipboard application 110 might recognize that image data selected by the user to be pasted into a target destination, such as when a user manually selects a data item from a list of available data items in the clipboard memory buffer, is not appropriate for an email address field.

At block 250, the clipboard application 110 automatically selects, without human intervention, a data item from the clipboard memory buffer that is appropriate for the target destination area. For example, the clipboard memory buffer may determine based on the metadata of the email address copied from the email application 120 and based on the metadata of the copied image that the email address is more appropriate in the email address field than the other data items stored in the clipboard memory buffer. In this way, the clipboard application 110 would select the email address from the clipboard memory buffer because it is appropriate for the email address field.

Alternatively, as stated above with regards to associating a data trait with a data item, the clipboard application 110 might also use various techniques to select a data item which is appropriate to paste into a target destination area. According to one embodiment, the clipboard application 110 might select to paste a data item based on the data format of the target destination. For example, if the target destination area requires a social security number, the clipboard application 110 might search the clipboard memory buffer for a data item in the format of a social security number (e.g., xxx-xx-xxxx, 9 digits, numeric data, etc); or the format of a phone number (e.g., xxx-xxx-xxxx, (xxx) xxx-xxxx, etc) if the target destination requires the format of a social security number, or other use formats well known to those in the art in a similar fashion.

The clipboard application 110 might also select a specific data item in the clipboard memory buffer based on the type of application the data will be placed into. For example, if the clipboard application 110 determines the target destination area is within an image editor application, then the clipboard application 110 might select an image data item from the clipboard buffer memory to the target destination area.

According to another embodiment, the clipboard application 110 might also determine to paste a data item based on the data size or data format of the data item stored in the clipboard memory buffer. For example, the clipboard application 110 might determine to place a large amount of text data or image data into a specific target destination area if the target destination area might typically manipulate a large amount of data, such as a word processing application or image editor, or to specific field of an application such as the body of an email which manipulates a large amount of text data. In contrast, the clipboard application 110 might select to paste a data item of small size into data fields that only hold a small amount of data.

In one embodiment, the clipboard application 110 automatically searches each data items in the clipboard memory buffer until one of the data items is determined to be appropriate for the target destination area. For example, upon determining that a user selected data item is not appropriate for a specific target destination area, the clipboard application 110 may sequentially attempt to paste the next most recent data item from the clipboard memory buffer into the target destination area until a selected data item is appropriate to be pasted into the target destination area.

It should be appreciated that there are numerous techniques or methods for the clipboard application 110 to determine which data item in the clipboard memory buffer is appropriate to be pasted into the target destination area, and the invention is not limited to the techniques disclosed. In one embodiment, the clipboard application 110 might attempt multiple methods to determine which data item from a clipboard memory buffer might be appropriate to paste into a target destination area.

Figure 3:
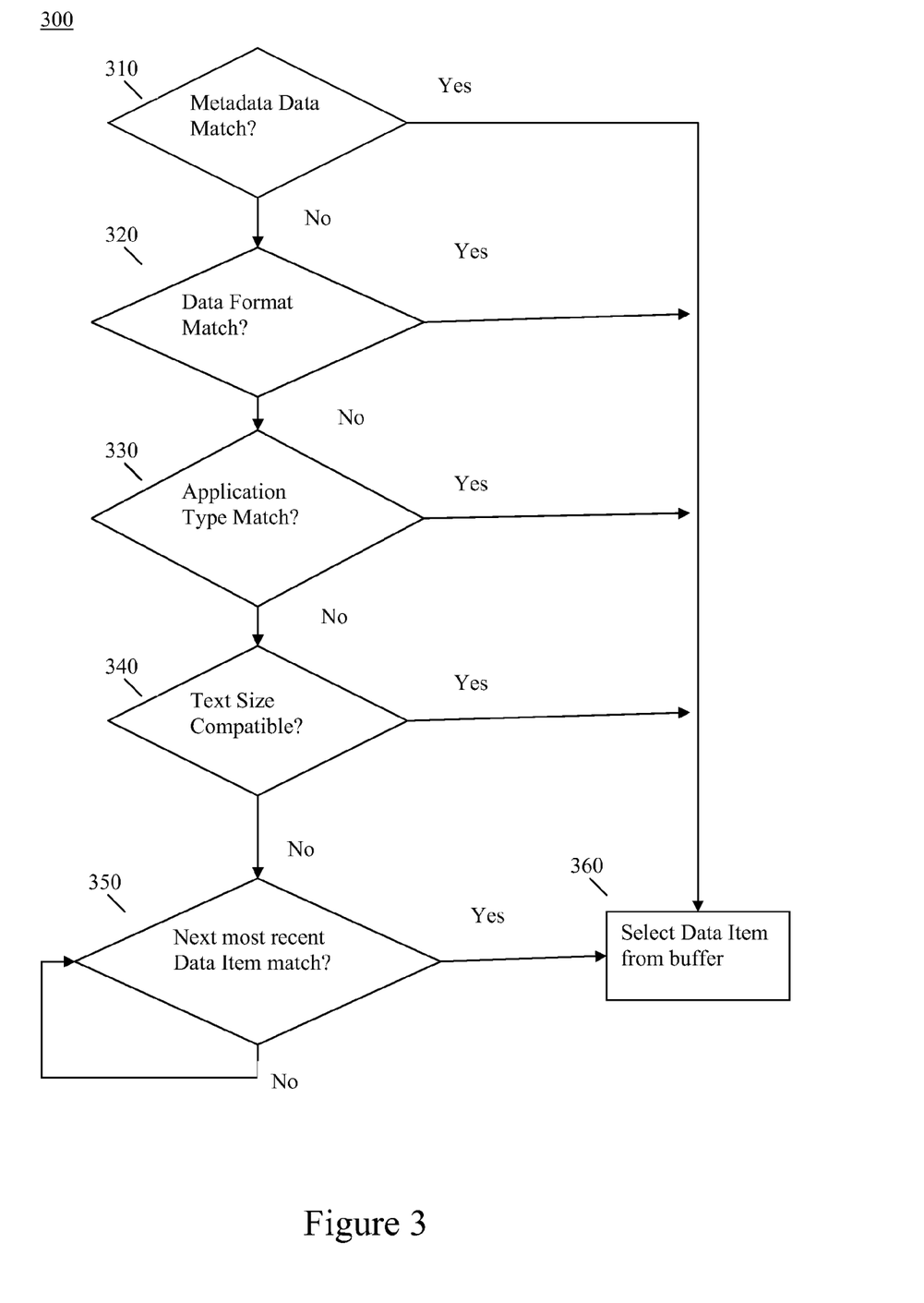
FIG. 3 illustrates one embodiment of a process flow to select an appropriate data item to paste in a target destination area.

FIG. 3 illustrates one embodiment of a process flow 300 for selecting an appropriate data item to paste in a target destination area. At block 310, if the clipboard application 110 determines metadata of data item from the clipboard matches the metadata of the target destination area, this data item is selected and processing continues to at block 360, else processing continues to block 320. At block 320, if the clipboard application 110 determines a data item from the clipboard matches a format of the target destination area, this data item is selected and processing continues to at block 360, else processing continues to block 330. At block 330, if the clipboard application 110 determines a data item from the clipboard matches an application type of the target destination area, this data item is selected and processing continues to at block 360, else processing continues to block 340. At block 340, if the clipboard application 110 determines a data item from the clipboard matches the appropriate size of the target destination area, this data item is selected and processing continues to at block 360, else processing continues to block 350. At block 350, if the clipboard application 110 determines whether the next most recently copied data item from in the clipboard memory buffer is appropriate for the target destination area, this data item is selected and processing continues to at block 360, else processing returns back to block 350 until a data item is selected that matches the data item (this data item is selected and processing continues to at block 360) or all the data items in the clipboard memory have been checked for appropriateness at block 350.

At block 360, the clipboard application 110 selects the data item from the clipboard memory buffer.

Continuing with the flow 200, at block 260, the clipboard application 110 pastes the selected data item to the target destination area. In one embodiment, the clipboard application 110 automatically pastes the data item to the target destination without intervention from the user. Alternatively, the clipboard application 110 might present the selected data item to the user as part of any inquiry seeking confirmation that the data item automatically selected by the clipboard application 110 should be pasted into the target destination area.

Figure 4:
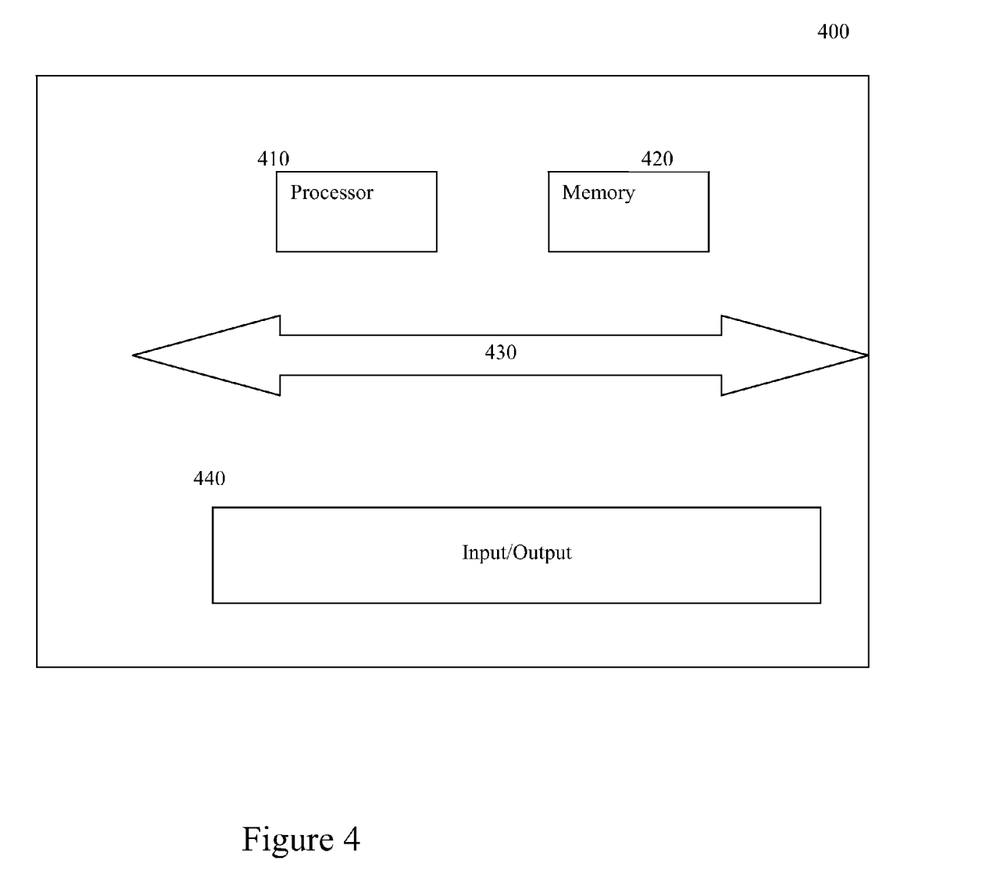
FIG. 4 illustrates a computer system according to one embodiment of the invention.

FIG. 4 illustrates one embodiment of a computer system 400 suitable for performing the features of the clipboard software application. The computer system 400 includes a processor 410, a memory 420, and an input/output capability 440, all coupled to a system bus 430. Such a configuration encompasses personal computer systems, handheld devices (such as a mobile phone, a personal digital assistant, an electronic tablet etc.), network computers, television based systems (such as Web TVs or set-top boxes), an interface in a car (e.g., dashboard display, flat panel display coupled with the car, etc.), and similar devices.

The processor 410 represents a central processing unit of any type of architecture (such as a CISC, RISC, VLIW, etc) or hybrid architecture. In addition, the processor 410 could be implemented on one or more chips. The memory 420 is configured to store instructions which, when executed by the processor 410, perform the methods described herein. The memory 420 may also store data items of the clipboard memory buffer as described. In one embodiment the clipboard software is stored in memory which could be accessed by multiple applications operating on the computer system. And allows for multiple data items to be pasted on to a clipboard.

Input/output 440 may include components to facilitate user interaction with the computer system 400 such as a keyboard, mouse, a pointer/stylus, a display monitor, a display, a network card (e.g., Ethernet, infrared, cable modem, fax/modem, etc), etc. It is well known by those of originally skill in the art that there are multiple techniques or graphical controls for copying and pasting data to and from the clipboard memory buffer including using a mouse device, a stylus, keyboard function keys, and/or hotkey function (e.g., Ctrl+C, Ctrl+V), among other methods of using a graphic user interface on computing environment 100.

Input/output 440 also encompasses various types of computer program products, including any type of storage device that is accessible by the processor 410.

The operating system software executing the clipboard application software stored in memory 420 may control the computer system 400. The operating system may be, for example, PC-based, Mac-based, Unix-based, PDA-based, etc. Input/output 440 and related media store computer program code for the operating system and methods of the present invention.

In addition, the bus 430 may represent one or more busses (e.g., PCI, ISA, X-Bus, EISA, VESA, etc.) and bridges (also termed as bus controllers). While this embodiment is described in relation to a single processor computer system, the invention could be implemented in a multi-processor computer system.

As will be appreciated by one skilled in the art, embodiments of the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
receiving a request from a user to paste a first data item from a clipboard memory buffer to a target destination area, the clipboard memory buffer including a plurality of data items, wherein the first data item is a most-recently-added one of the plurality of data items; and

9 responsive to receiving the request, performing, by the computer without input from the user:
  determining that the first data item is not appropriate for the target destination area;
  selecting, from the plurality of data items, a particular one of the data items which is appropriate for the target destination area, wherein the selected particular one is a not-most-recently-added one of the plurality of data items; and
  pasting the selected particular one of the data items to the target destination area.

2. The computer-implemented method of claim 1, wherein the determining that the first data item is not appropriate includes determining that a data trait of the first data item does not match a data trait of the target destination area.

3. The computer-implemented method of claim 1, wherein selecting the particular one from the plurality of data items includes selecting the particular one from the plurality of data items responsive to determining that the particular one has a data trait matching a data trait of the target destination area.

4. The computer-implemented method of claim 1, wherein the selecting comprises sequentially evaluating each of the plurality of data items in the clipboard memory buffer for appropriateness for the target destination area, until evaluating the particular one and concluding that the particular one is appropriate for the target destination area.

5. The computer-implemented method of claim 2, wherein:
  the data trait of the first data item comprises a data type of the first data item; and
  the data trait of the target destination area comprises a data type of the target destination area.

6. A computer system comprising:
  a computer comprising a processor; and
  instructions which are configured to execute a clipboard software application using the processor of the computer, the clipboard software application adapted to enable storage of a plurality of data items in a clipboard memory buffer, each data item having a data trait, wherein the clipboard application automatically selects a particular one of the data items to be pasted to a target destination area and automatically pastes the selected particular one to the target destination area, without input from a user, upon determining that the user has selected one of the plurality of data items that is not appropriate to be pasted into the target destination area but that the automatically-selected particular one is appropriate to be pasted into the target destination area, wherein the user-selected one of the data items is a most-recently-added one of the plurality of data items and the automatically-selected one of the data items is a not-most-recently-added one of the plurality of data items.

7. The computer system of claim 6, wherein:
  the target destination area is a word processing application; and
  the user-selected one of the data items is not appropriate to be pasted into the word processing application.

8. The computer system of claim 6, wherein:
  the data trait of the user-selected one of the data items comprises a data format of the user-selected one of the data items; and
  the data trait of the automatically-selected one of the data items comprises a data format of the automatically-selected one of the data items.

9. A computer implemented method comprising:
  receiving a first data item for storing in a clipboard buffer;

10 receiving a second data item for storing in the clipboard buffer, wherein:
  the second data item is a most-recently-added one of the plurality of data items;
  the first data item is a not-most-recently-added one of the plurality of data items; and
  the first data item and the second data item have different data traits;
  receiving a request from a user to paste the second data item to a target destination area, the target destination area having a data trait; and
  responsive to receiving the request, automatically performing, by the computer without input from the user:
  determining that the data trait of the second data item is not appropriate for the data trait of the target destination area but that the data trait of the first data item matches the data trait of the target destination area:
  selecting the first data item for pasting to the target destination area; and
  pasting the first data item to the target destination area.

10. The computer-implemented method of claim 9 wherein determining that the data trait of the second data item is not appropriate includes determining that the data trait of the second data item does not match the data trait of the target destination area.

11. The computer-implemented method of claim 9, further comprising:
  receiving at least one additional data item for storing in the clipboard buffer; and
  wherein the selecting comprises sequentially evaluating each of the data items received for storing in the clipboard memory buffer for appropriateness for the target destination area, until evaluating the first data item and concluding that the first data item is appropriate for the target destination area.

12. The computer-implemented method of claim 10, wherein:
  the data trait of the first data item comprises a data type of the first data item; and
  the data trait of the target destination area comprises a data type of the target destination area.

13. A computer-implemented method comprising:
  receiving a plurality of data items from a user for storing in a clipboard buffer;
  associating and storing a data trait with each of the data items received upon storing each of the data items in the clipboard buffer;
  receiving a request from the user to paste a first one of the data items to a target destination area, wherein the first data item is a most-recently-added one of the plurality of data items; and
  responsive to receiving the request, performing, by the computer without input from the user:
  determining that the data trait associated with the first data item is not appropriate for the target destination area;
  selecting, from the plurality of data items, a particular one of the data items for which the associated data trait is appropriate for the target destination area, wherein the selected particular one is a not-most-recently-added one of the plurality of data items; and
  pasting the selected particular one of the data items to the target destination area.

14. The computer-implemented method of claim 13, wherein:
  the data trait of the first data item comprises a data format of the first data item; and the data trait of the target destination area comprises a data format of the target destination area.

15. A computer program product for pasting a data item to a target destination area, the computer program product comprising:
- a non-transitory computer usable medium having computer usable program code embodied therewith, the computer usable program code comprising computer usable program code configured to:
- receive an indication from a user to paste a first data item from a clipboard memory buffer to a target destination area, the clipboard memory buffer including a plurality of data items, wherein the first data item is a most-recently-added one of the plurality of data items; and
- responsive to receiving the indication, perform, by the computer without input from the user:
- determining that the first data item is not appropriate for the target destination area;
- selecting, from the plurality of data items, a particular one of the data items which is appropriate for the target destination area, wherein the selected particular one is a not-most-recently-added one of the plurality of data items; and
- pasting the selected particular one of the data items to the target destination area.

16. The computer program product of claim 15 wherein the selected particular one of the data items is the second most recent data item received into the clipboard memory buffer.

17. The computer program product of claim 15, wherein selecting the particular one of the data items from the plurality of data items includes selecting the particular one of the data items from the plurality of data items responsive to determining that the particular one has a data trait matching a data trait of the target destination area.

18. The computer program product of claim 17, wherein:
- the data trait of the first data item comprises an application type from which the first data item was received into the clipboard memory buffer; and
- the data trait of the target destination area comprises an application type which provides the target destination area.

* * * * *